United States Patent
Alghamdi

(10) Patent No.: US 11,435,272 B1
(45) Date of Patent: Sep. 6, 2022

(54) METHOD OF DETERMINING SHEAR STRENGTH OF SOIL USING FALL CONE APPARATUS

(71) Applicant: King Abdulaziz University, Jeddah (SA)

(72) Inventor: Mohammed Alghamdi, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/578,995

(22) Filed: Jan. 19, 2022

(51) Int. Cl.
*G01N 3/303* (2006.01)

(52) U.S. Cl.
CPC ....... *G01N 3/303* (2013.01); *G01N 2203/001* (2013.01); *G01N 2203/0025* (2013.01)

(58) Field of Classification Search
CPC .......... G01N 3/303; G01N 3/48; G01N 33/24; G01N 2203/001; G01N 2203/0025; G01N 2203/0082
See application file for complete search history.

(56) References Cited

U.S. PATENT DOCUMENTS

| | | | | |
|---|---|---|---|---|
| 5,313,825 A * | 5/1994 | Webster | ............... | E02D 1/022 73/84 |
| 5,426,972 A * | 6/1995 | Heirtzler | ............... | G01N 3/30 73/594 |
| 5,726,349 A * | 3/1998 | Palmertree | ............... | G01N 3/40 73/84 |
| 7,617,718 B2 * | 11/2009 | Kinast | ............... | G01N 3/48 73/84 |

FOREIGN PATENT DOCUMENTS

| | | | |
|---|---|---|---|
| CN | 212872462 U | * | 4/2021 |
| CN | 112964577 A | | 6/2021 |
| KR | 2018082750 A | | 7/2018 |

OTHER PUBLICATIONS

Kumbhar et al.: "A Study on Correlation between Liquid Limit by Cone Penetrometer and Casagrande Method", International Journal of Science and Research, vol. 6, p. 1386-1389, Jan. 2017.
Shimobe et al: "Fall cone tests considering water content, cone penetration index, and plasticity angle of fine-grained soils", Journal of Rock Mechanics and Geotechnical Engineering, 2014.
Zeng et al: "Relationship between the Shear Strength and the Depth of Cone Penetration in Fall Cone Tests", Hindawi, 2020.

* cited by examiner

*Primary Examiner* — Natalie Huls
(74) *Attorney, Agent, or Firm* — WC&F IP

(57) ABSTRACT

A method of determining shear strength of soil using a fall cone apparatus is provided. The method includes generating a first plot having graph lines defined for penetration depth values ranging from 4 to 20 mm on a first logarithmic paper, deducing a first mathematical model based on the first plot, and generating a second plot having the graph lines extended for a predefined penetration depth range based on the first mathematical model. The method further includes generating a third plot having graph lines corresponding to the extended penetration depth values defined for the W/A ratio values ranging from 0.17 to 13.3 on a second logarithmic paper, deducing a second mathematical model based on the third plot, generating a fourth plot having the graph lines extended for a predefined W/A ratio range based on the second mathematical model, and determining shear strength based on the fourth plot.

12 Claims, 7 Drawing Sheets

METHOD OF DETERMINING SHEAR STRENGTH OF SOIL USING FALL CONE APPARATUS

TECHNICAL FIELD

The present disclosure relates, in general, to methods of determining soil properties, and more specifically, relates to a method of determining the shear strength of soil using a fall cone apparatus.

BACKGROUND

Shear strength is one of the most important soil properties in soil mechanics Geotechnical and civil engineers use the shear strength property of soil to estimate bearing capacity, retaining wall safety, slope stability, and pavement. The shear strength of soil can be defined as soil's resistance to failure. The shear strength is also a function of the type of the soil and physical and chemical properties [Adeyeri, J.B. Technology and Practice in Geotechnical Engineering; Idea Group: USA, 2015; ISBN 9781466665057]. Undrained shear strength is a unique property in soil mechanics because it provides a quick index for determining soft clay's strength. Further, the undrained shear strength is necessary for design foundation, construction, and similar engineering works.

Typically, the undrained shear strength of soil is determined using a fall cone apparatus, which was first introduced in 1915 by John Olsson [Brand, E.; Brenner R. Soft Clay Engineering, 1st ed.; Elsevier Science: Amsterdam, The Netherlands, 1981; Volume 20, ISBN 9780444600783]. With capabilities ranging from 0.01 to 20 t/m$^2$, a new approach to determine shear strength using fall cone test was introduced in 1957 by Hansbo [Hansbo, S. A New Approach to Determination of the Shear Strength of Clay by the Fall Cone Test; 1957]. The undrained shear strength of soil depends on the penetration depth of a fall cone and weight thereof [O'kelly, B.; Vardanega, P.; Haigh, S. Use of fall cones to determine Atterberg limits: a review. Géotechnique 2018, 68, 843-856, doi:10.1680/jgeot.17.R.039].Fall cone equipment is manufactured by GEONOR A/S (August, NJ, USA), which was established in 1957 by The Norwegian Geotechnical Institute (NGI) [GEONOR, A.S. Laboratory Cone Apparatus g-200; Instruction Manual; GEONOR: 1974]. However, due to limitation on the number of cones, shortage of empirically tabulated data, and lack of graph, there is a need for measuring shear strength of soil beyond the capability of the existing fall cone apparatus.

SUMMARY

According to one aspect of the present disclosure, a method of determining shear strength of soil using a fall cone apparatus is disclosed. The method includes generating a first plot on a first double logarithmic paper with a horizontal axis representing penetration depth values and a vertical axis representing a first set of shear strength values based on data obtained from a plurality of cones of the fall cone apparatus. The first plot includes a plurality of graph lines defined for penetration depth values of 4 to 20 millimeters (mm). The method further comprises deducing a first mathematical model based on data obtained from the first plot. The method further includes generating a second plot on the first double logarithmic paper based on the first mathematical model. Each graph line is extended beyond the penetration depth range for a corresponding predefined penetration depth range. In one embodiment, the predefined penetration depth range is 1 to 100 mm In another embodiment, the predefined penetration depth range is 1 to 4 mm In yet another embodiment, the predefined penetration depth range is 20 to 100 mm The method further includes generating a third plot on a second double logarithmic paper with a horizontal axis representing weight per apex angle (W/A) ratio values and a vertical axis representing the first set of shear strength values based on data obtained from the plurality of cones. The third plot includes a plurality of graph lines corresponding to the extended penetration depth values defined for the W/A ratio values ranging from 0.17 to 13.3. The method further includes deducing a second mathematical model based on data obtained from the third plot. Finally, the method further includes generating a fourth plot on the second double logarithmic paper based on the second mathematical model. Each graph line is extended beyond the W/A ratio range for a corresponding predefined W/A ratio range. In one embodiment, the predefined W/A ratio range is 0.1 to 100. In another embodiment, the predefined W/A ratio range is 0.1 to 0.17. In yet another embodiment, the predefined W/A ratio range is 13.3 to 100.

The method further includes determining a second set of shear strength values based on the fourth plot. In one embodiment, the method includes determining the second set of shear strength values in a range of 0.0001-1000 t/m$^2$ based on the predefined penetration depth range and the predefined W/A ratio range.

In some embodiments, the method further includes deducing each of the first mathematical model and the second mathematical model based on a power function corresponding to a formula, $f(x)=\alpha x^p$, wherein x is an independent variable, $\alpha \neq 0$ is a constant, and p is a real number.

In some embodiments, the method further includes deducing each of the first mathematical model and the second mathematical model based on the coefficient of determination ($R^2$) greater than 0.99.

In some embodiments, the plurality of cones of the fall cone apparatus includes a first cone having a W/A ratio of 13.3, a second cone having a W/A ratio 3.3, a third cone having a W/A ratio 1.00, and a fourth cone having a W/A ratio 0.17.

According to another aspect of the present disclosure, a method of determining the shear strength of soil using a fall cone apparatus is disclosed. The method includes generating a first plot on a first double logarithmic paper with a horizontal axis representing penetration depth values and a vertical axis representing a first set of shear strength values based on data obtained from a plurality of cones of the fall cone apparatus. The first plot includes a plurality of graph lines defined for penetration depth values ranging from 4 to 20 millimeters (mm). The method further includes deducing a first mathematical model based on data obtained from the first plot. The method further generates a second plot on the first double logarithmic paper based on the first mathematical model. Each graph line is extended for penetration depth values ranging from 1 to 100 mm The method further includes generating a third plot on a second double logarithmic paper with a horizontal axis representing weight per apex angle (W/A) ratio values and a vertical axis representing the first set of shear strength values based on data obtained from the plurality of cones. The third plot includes a plurality of graph lines corresponding to the extended penetration depth values defined for W/A ratio values ranging from 0.17 to 13.3. The method further includes deducing a second mathematical model based on data obtained from the third plot. The method further includes generating a fourth plot on the second double logarithmic paper based on the second mathematical model. Each graph line is extended for W/A ratio values ranging from 0.1 to 100. The method further includes determining a second set of shear strength values in a range of 0.0001-1000 t/m² based on the fourth plot having the extended penetration depth range of 1 to 100 mm and the extended W/A ratio range of 0.1 to 100. Each of the first mathematical model and the second mathematical model is deduced based on a power function corresponding to a formula, $f(x)=\alpha x^p$, wherein x is an independent variable, $\alpha \neq 0$ is a constant, and p is a real number.

These and other aspects and features of non-limiting embodiments of the present disclosure will become apparent to those skilled in the art upon reviewing the following description of specific non-limiting embodiments in conjunction with the accompanying drawings.

BRIEF DESCRIPTION OF THE DRAWINGS

A better understanding of embodiments of the present disclosure (including alternatives and/or variations thereof) may be obtained concerning the detailed description of the embodiments along with the following drawings, which.

DETAILED DESCRIPTION

Reference will now be made in detail to specific embodiments or features illustrated in the accompanying drawings. Wherever possible, corresponding or similar reference numbers will be used throughout the drawings to refer to the identical or corresponding parts. Moreover, references to various elements described herein are made collectively or individually when more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
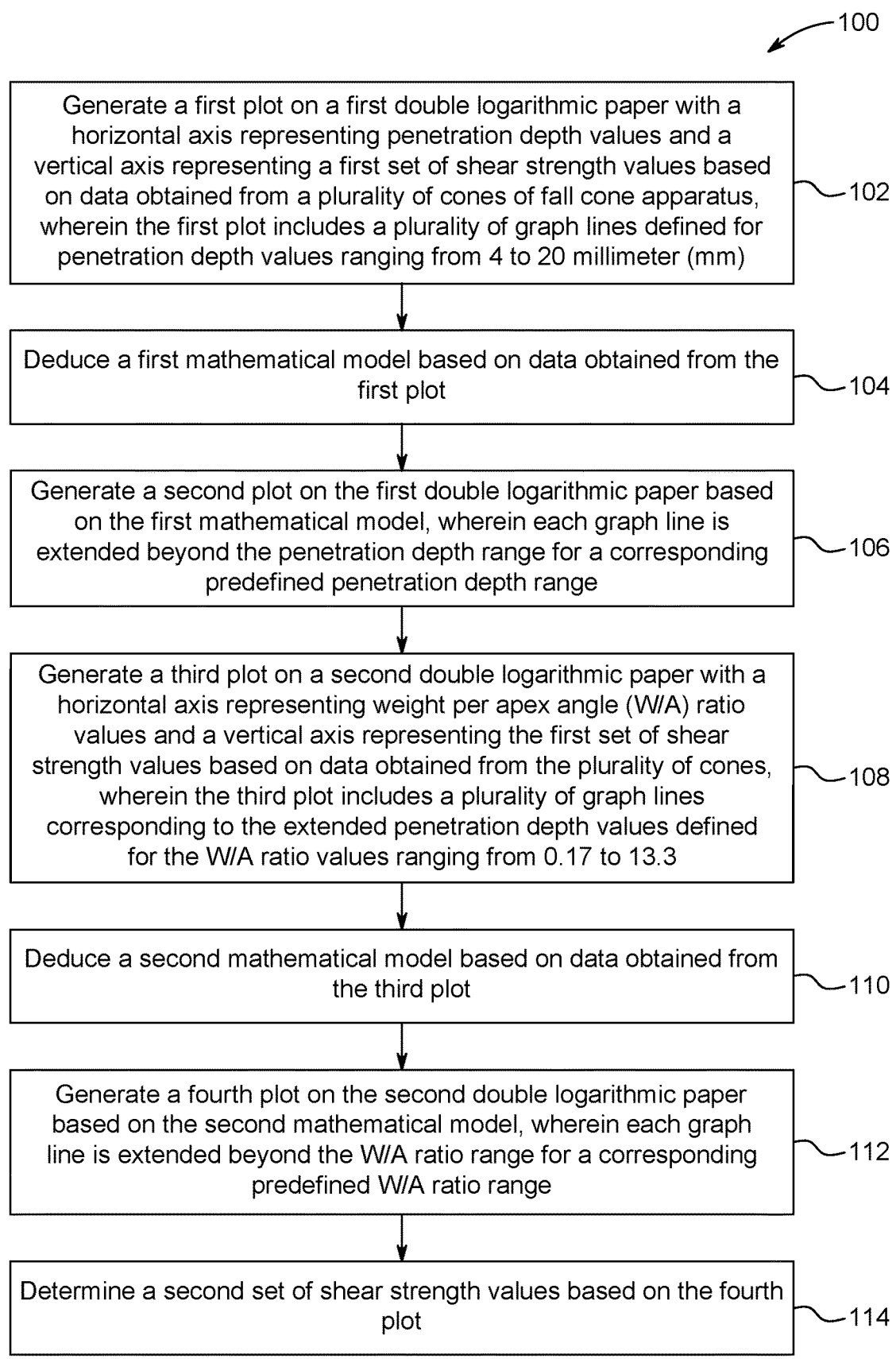
FIG. 1 is a schematic flow diagram of a method of determining the shear strength of soil using a fall cone apparatus, according to an embodiment of the present disclosure.

Referring to FIG. 1, a schematic flow diagram of a method 100 of determining the shear strength of soil is illustrated, according to an embodiment of the present disclosure. Various soil properties, including, but not limited to, shear strength, are determined for estimating the strength of soil, such as bearing capacity, retaining wall safety, and pavement. The shear strength may be defined as a property of soil that indicates resistance to soil failure. The shear strength is also defined based on the type of soil and physical and chemical properties of the soil. Another type of shear strength is undrained shear strength, which may be defined based on various factors including, but not limited to, rate of shearing, the volume of material, and stress path. The undrained shear strength may help to determine the strength of soft clay. The undrained shear strength is also determined for design foundation and construction.

Figure 2:
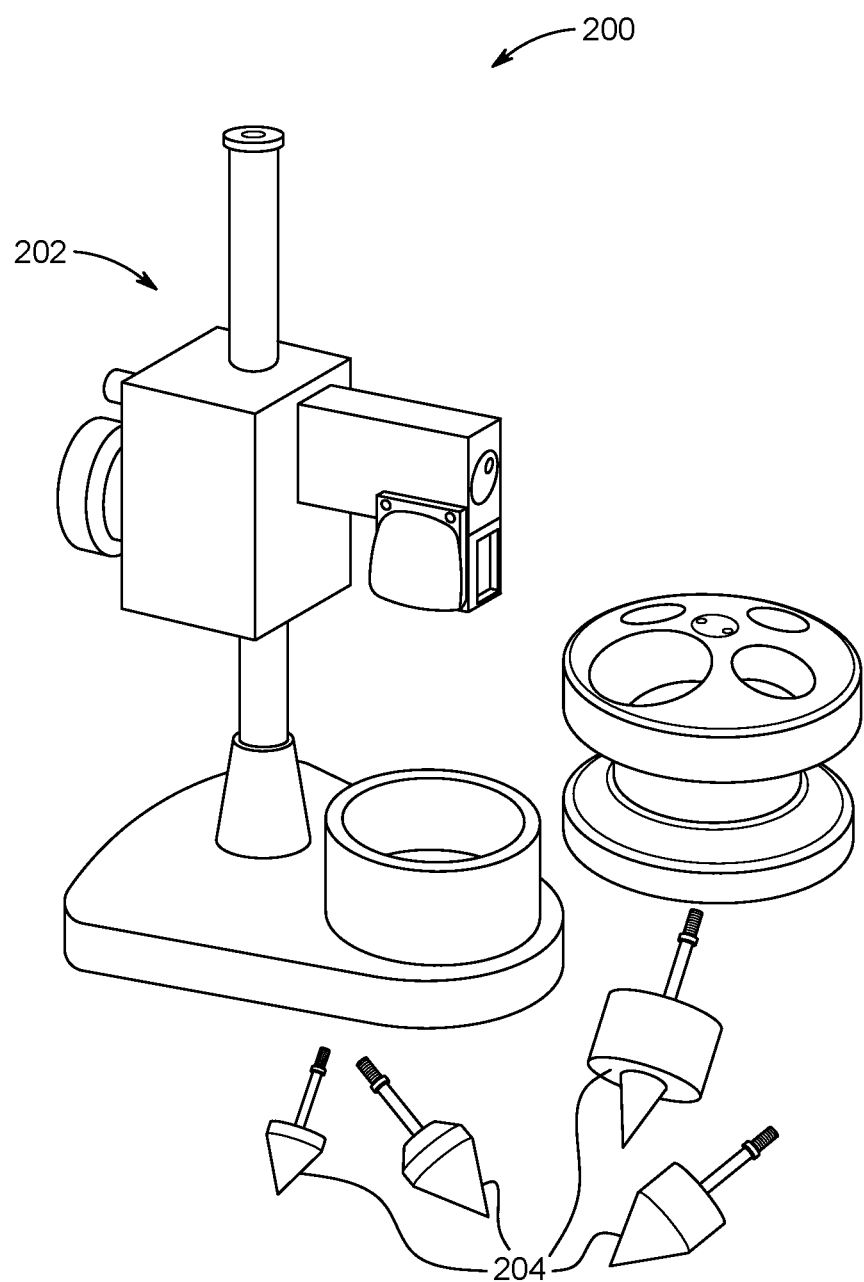
FIG. 2 is a schematic perspective view of the fall cone apparatus.

According to the present disclosure, the shear strength of soil is determined based on a fall cone apparatus 200 shown in FIG. 2. The fall cone apparatus 200 provides a rapid, simple, and accurate method for determining the undrained shear strength of soil and sensitivity of both undisturbed and remolded clays. The fall cone apparatus 200 is also used for determining the liquid limit of soil. The fall cone apparatus 200 includes a testing platform 202 and a plurality of cones 204. Each cone 204 is identified based on a weight per apex angle (W/A) ratio. In an embodiment, the plurality of cones 204 of the fall cone apparatus 200 includes a first cone having a W/A ratio of 13.3, a second cone having a W/A ratio of 3.3, a third cone having a W/A ratio of 1.00, and a fourth cone having a W/A ratio of 0.17. The first, second, third, and fourth cones are collectively referred to as 'the cones 204' and individually referred to as 'the cone 204' unless otherwise specifically mentioned. The testing platform 202 is used to perform soil testing using the plurality of cones 204 to determine the shear strength of a given soil sample.

The undrained shear strength is measured based on the weight of cone 204 and penetration depth of cone 204. More particularly, the undrained shear strength (designed by S) is directly proportional to the weight of the cone 204 and inversely proportional to the square of the penetration depth of the cone 204 [O'kelly, B.; Vardanega, P.; Haigh, S. Use of fall cones to determine Atterberg limits: a review. Géotechnique 2018, 68, 843-856, doi:10.1680/jgeot.17.R.039]. The formula for determining the shear strength of the soil is represented by:

$$S = K \frac{W}{d^2}$$

Wherein K is cone factor.

Figure 3:
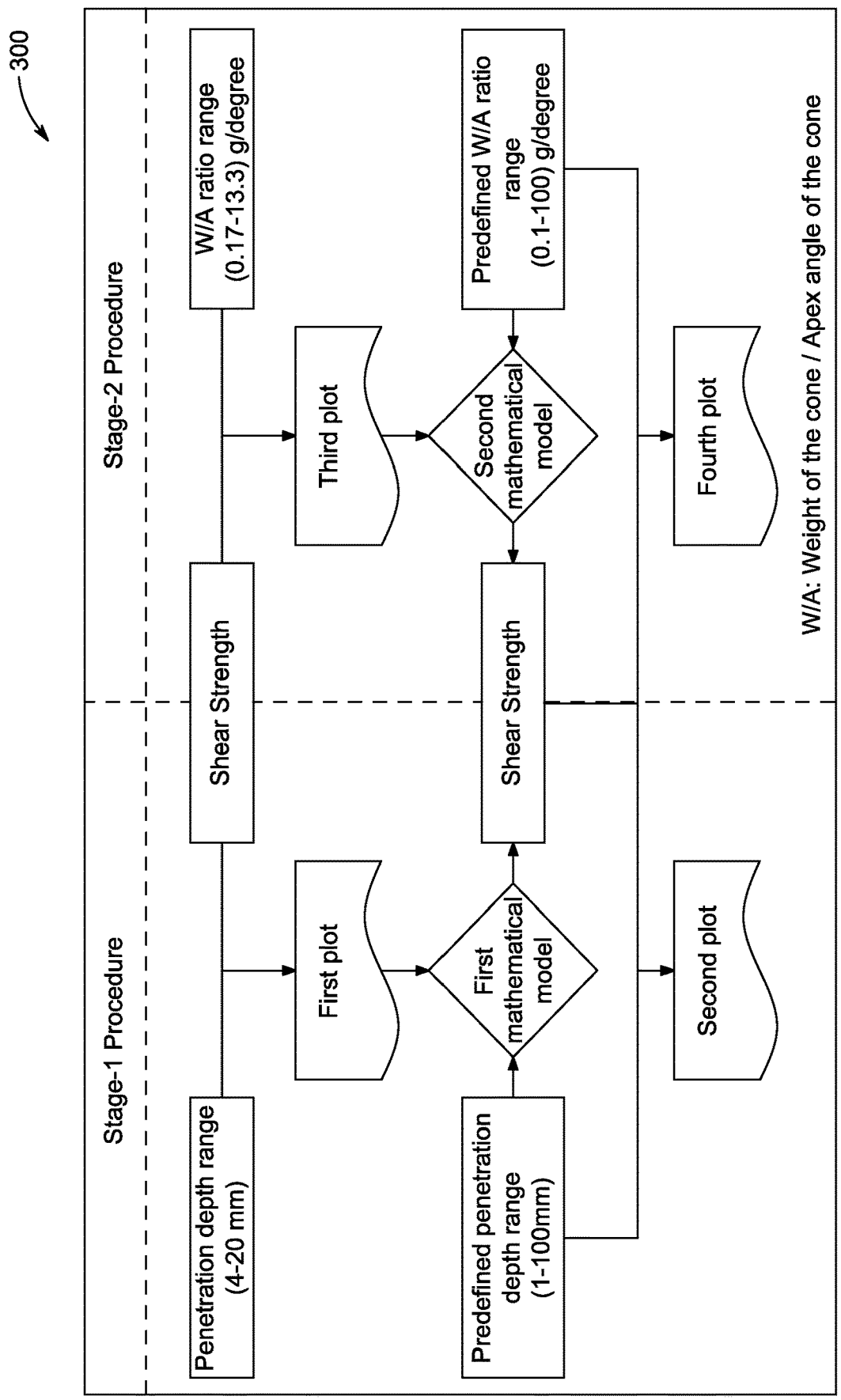
FIG. 3 is a schematic block diagram illustrating a two-stage procedure for determining the shear strength of soil, according to an embodiment of the present disclosure.

Referring to FIG. 3, a schematic block diagram showing a two-stage procedure 300 for determining the shear strength of the soil is illustrated, according to an embodiment of the present disclosure. The two-stage procedure 300 includes a 'Stage-1 procedure' and a 'Stage-2 procedure'. Method 100 of determining the shear strength of the soil is described regarding FIG. 1, FIG. 2, and FIG. 3. The order in which method 100 is described is not intended to be construed as a limitation, and any number of the described method steps can be combined in any order to implement method 100. Additionally, individual steps may be deleted from method 100 without departing from the spirit and scope of the present disclosure.

Figure 4:
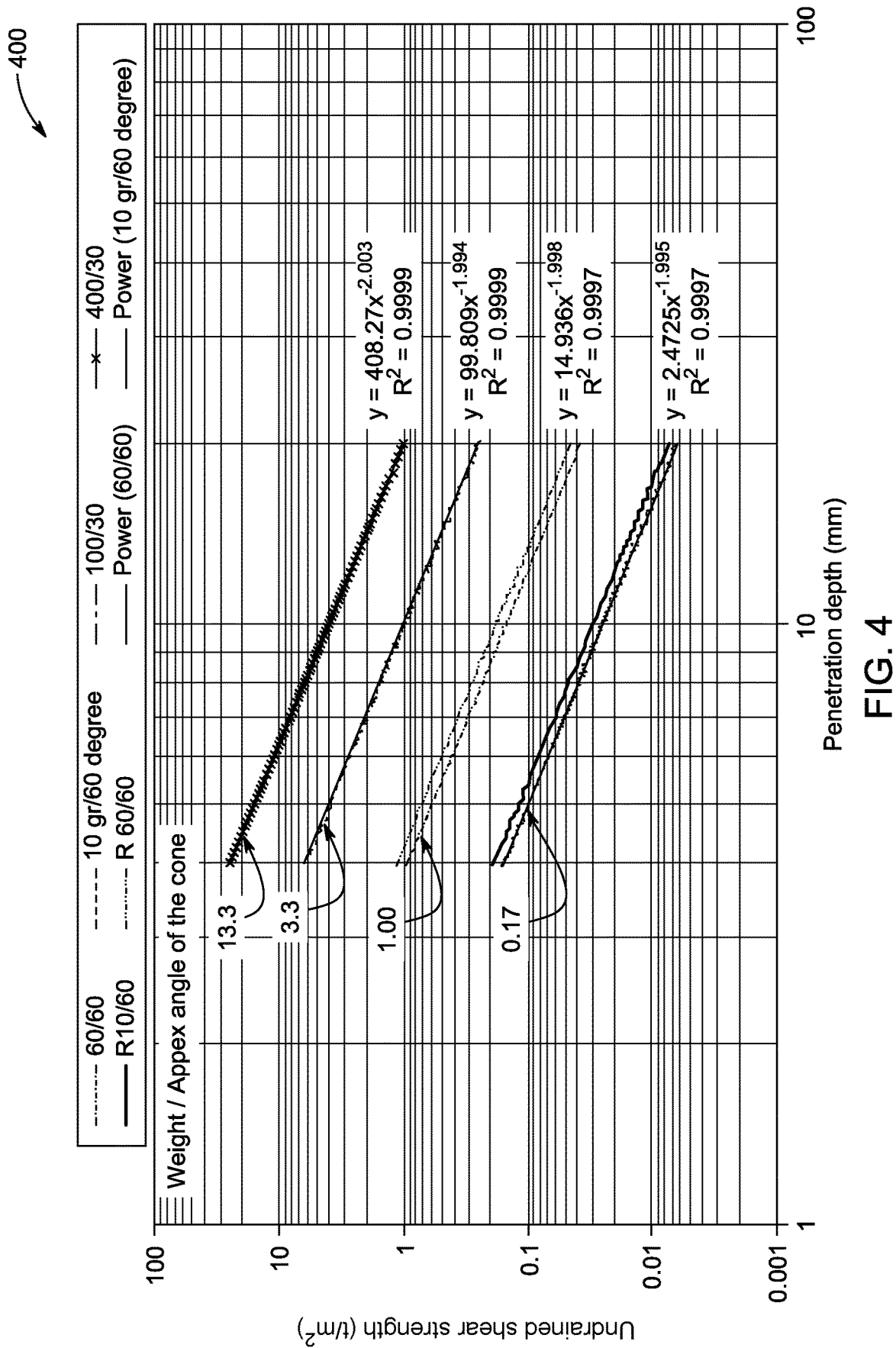
FIG. 4 is a graphical representation of a first plot on a first double logarithmic paper with a horizontal axis representing penetration depth values and a vertical axis representing a first set of shear strength values, according to an embodiment of the present disclosure.

At step 102 and the Stage-1 procedure, method 100 includes generating a first plot 400 on a first double logarithmic paper as shown in FIG. 4. The first double logarithmic paper has a horizontal axis representing penetration depth values on a scale of 1 to 100 mm A vertical axis represents a first set of shear strength values on a scale of 0.001 to 100 tones per square meter ($t/m^2$). The first plot 400 is generated based on data obtained from the plurality of cones 204, particularly the first cone, the second cone, the third cone, and the fourth cone. The data obtained from cones 204 may be lab data or experimental data corresponding to sample soil. The first plot 400 includes a plurality of graph lines defined for penetration depth values ranging from 4 to 20 millimeters (mm). Particularly, the plurality of graph lines includes a first graph line corresponding to the first cone having the W/A ratio of 13.3, a second graph line corresponding to the second cone having the W/A ratio of 3.3, a third graph line corresponding to the third cone having the W/A ratio of 1.0, and a fourth graph line corresponding to the fourth cone having the W/A ratio of 0.17. The four cones 204 of the fall cone apparatus 200 are designed to determine the shear strength for 4 to 20 mm penetration depth. Hence, the four graph lines are defined for the 4 to 20 mm penetration depth range. In an example, the graph lines are plotted on the first double logarithmic paper having the horizontal axis representing the penetration depth values in mm and the vertical axis representing the first set of shear strength values in $t/m^2$. In the first double logarithmic paper, all the four graph lines parallel to each other. The tabulated empirical data were provided by SGI publication No. 14 by GEONOR [O'kelly, B.; Vardanega, P.; Haigh, S. Use of fall cones to determine Atterberg limits: a review. Géotechnique 2018, 68, 843-856, doi:10.1680/jgeot.17.R.039].

At step 104 and the Stage-1 procedure, method 100 includes deducing a first mathematical model based on data obtained from the first plot 400. The first mathematical model is deduced and used to measure the shear strength of the soil. Particularly, the first mathematical model, or a mathematical expression, for a relationship between the shear strength and the penetration depth is deduced for the four cones 204 using MS Excel 2016 (Microsoft, Redmond, WA, USA). Method 100 further includes deducing the first mathematical model based on a power function corresponding to a formula, $$f(x) = \alpha x^p,$$

wherein x is an independent variable, $\alpha \neq 0$ is a constant, and p is a real number.

The power function is fundamental for fractal geometry, which appears as a straight line on a double logarithmic paper [Mandelbrot, B.B. The Fractal Geometry of Nature; 1977; doi:10.2307/2323761]. On the double logarithmic paper, parameter p indicates the slope of the straight line. Graphically, the power function can resemble exponential or logarithmic functions for some independent variables. As the variables become very large, power functions and exponential or logarithmic functions begin to diverge from one another. An exponentially growing function overtakes a growing power function for large independent variable values. Conversely, growing power functions surpass logarithmic functions for large independent variable values.

For each cone 204, with a coefficient of determination ($R^2$)>0.99, the power function is inferred as the best mathematical model of shear strength vs. penetration depth. In other words, method 100 includes deducing the first mathematical model based on the coefficient of determination ($R^2$) greater than 0.99. The coefficient of determination measures how predictable the variance of the independent variable is, or it is the percentage of data that is close to the best fit line. $R^2$ provides a measure of how the model replicates well-observed outcomes based on the proportion of total variation of outcomes explained by the model [Mountford, M.D.; Steel, R.G.D.; Torrie, J.H. Principles and Procedures of Statistics with Special Reference to the Biological Sciences; McGraw Hil: New York, NY, USA, 1960; Glantz, S.A.; Slinker, B.K.; Neilands, T.B. Primer of Applied Regression and Analysis of Variance; McGraw-Hill: New York, NY, USA, 1990; ISBN 978-0-07-023407-9; and Draper, N.R.; Smith, H. Applied Regression Analysis; Wiley-Interscience: 1998; ISBN 978-0-471-17082-21].

The range of $R^2$ extends from zero to one. The values near one mean that most of the variation of the response data is explained by the different input values [Sheldon, M.R. Introductory Statistics, 3rd ed.; Elsevier: Amsterdam, The Netherlands, 2010; ISBN 9780123743886 0123743885]. $R^2$ is calculated by squaring correlation coefficient (r) [Reyment, R.A.; Davis, J.C. Statistics and Data Analysis in Geology; John Wily and Sons: Hoboken, NJ, USA, 1986; 646p]. The correlation coefficient measures the strength and direction of the relationship between variables using the following expression:

$$r = \frac{\sum (x - \bar{x})(y - \bar{y})}{\sqrt{\sum (x - \bar{x})^2 \sum (y - \bar{y})^2}}$$

Where $\bar{x}$ and $\bar{y}$ are arithmetic averages of the concerned variable.

Figure 5:
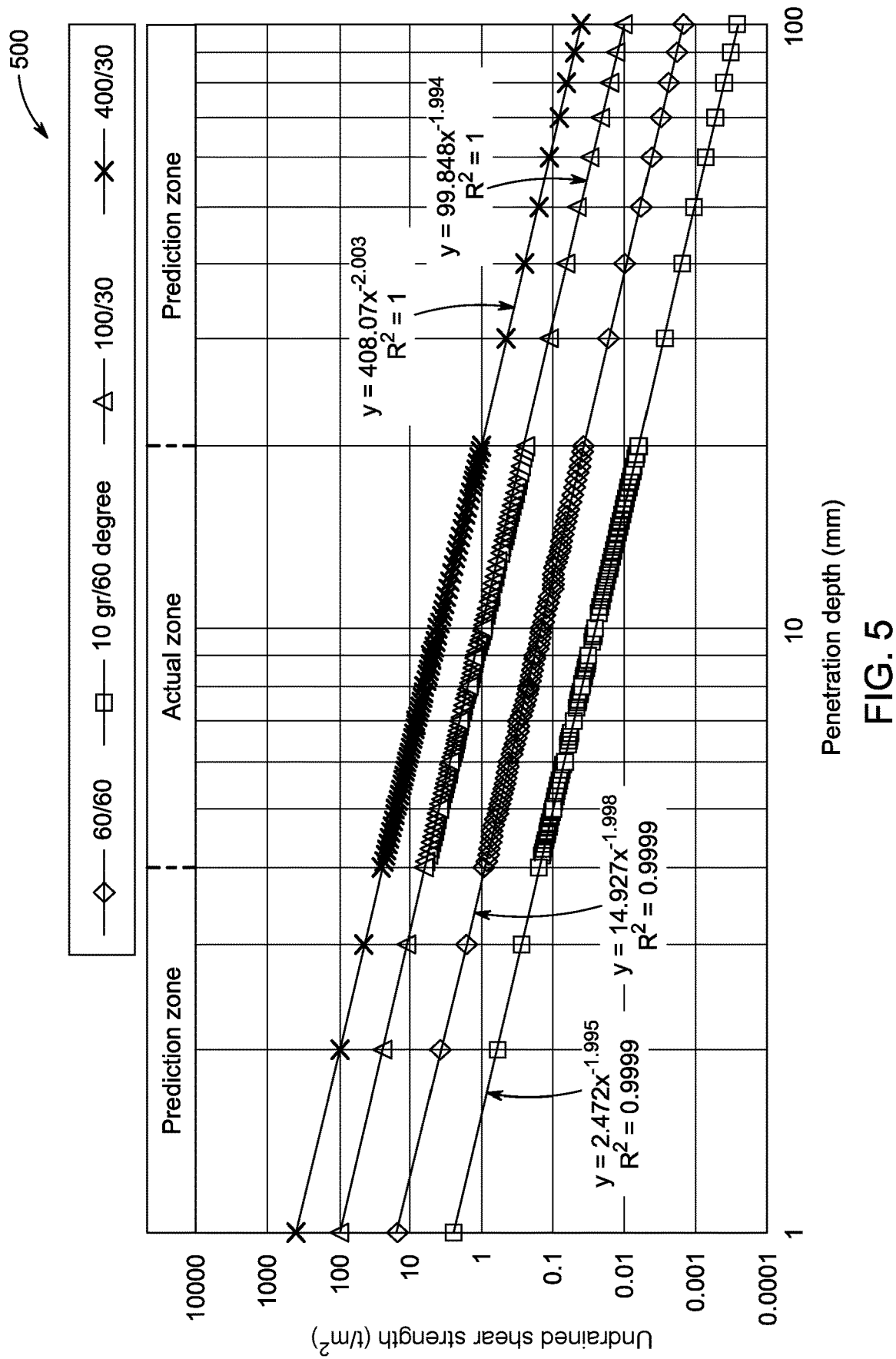
FIG. 5 is a graphical representation of a second plot on the first double logarithmic paper, according to an embodiment of the present disclosure.

At step 106 and the Stage-1 procedure, method 100 includes generating a second plot 500 on the first double logarithmic paper, as shown in FIG. 5, based on the first mathematical model. Each graph line is extended beyond the 4 to 20 mm penetration depth range for a corresponding predefined penetration depth range. As a prediction procedure, each of the four graph lines is extended until the end of the first plot 400 as best fit representative lines with penetration depth values ranging from 1 to 100 mm According to the present disclosure, the predefined penetration depth range for which the shear strength determined is 1 to 100 mm In other words, the predefined penetration depth range refers to the penetration depth scale of 1 to 100 mm of the second plot 500. In some embodiments, the predefined penetration depth range may be further extended beyond the range of 1 to 100 mm as desired; in such a case, the scale of penetration depth may be extended beyond the range of 1 to 100 mm in the second plot 500.

As shown in FIG. 5, the second plot 500 is separated by a prediction zone and an actual zone, and the graph lines are extended across the prediction zone and the actual zone. The actual zone of the second plot 500 is defined for the penetration depth values ranging from 4 to 20 mm, whereas the prediction zone of the second plot 500 is defined for the penetration depth values ranging from 1 to 4 mm and 20 to 100 mm As such, in some embodiments, the predefined penetration depth range is 1 to 4 mm In some embodiments, the predefined penetration depth range is 20 to 100 mm The extended graph lines falling under the actual zone are defined based on the original data, or the data obtained from the fall cone apparatus 200. The extended graph lines falling under the prediction zone are defined based on prediction inferred from the first mathematical model.

Figure 6:
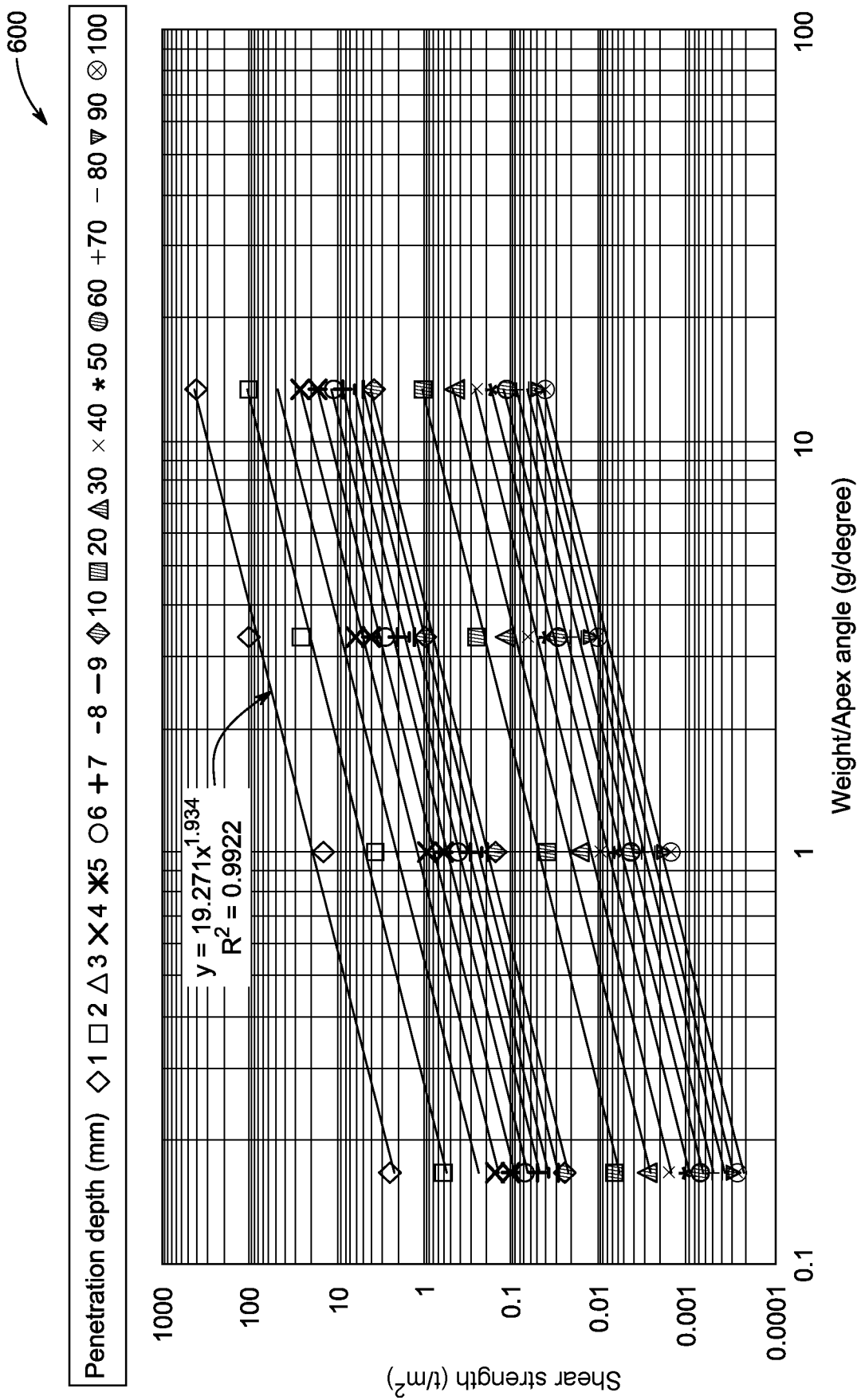
FIG. 6 is a graphical representation of a third plot on a second double logarithmic paper with a horizontal axis representing weight per apex angle (W/A) ratio values and a vertical axis representing the first set of shear strength values, according to an embodiment of the present disclosure.

At step 108 and the Stage-2 procedure, method 100 generates a third plot 600 on a second double logarithmic paper as shown in FIG. 6. The second double logarithmic paper has a horizontal axis representing the W/A ratio values of 0.1 to 100 and a vertical axis representing the first set of shear strength values on a scale of 0.0001 to 1000 t/m². The third plot 600 is generated based on the data obtained from the plurality of cones 204 of the fall cone apparatus 200. The third plot 600 includes a plurality of graph lines corresponding to the extended penetration depth values, as described in FIG. 5, defined for the W/A ratio values ranging from 0.17 to 13.3. Particularly, the plurality of graph lines is defined based on the penetration depth values listed in Table 1. The four cones 204 of the fall cone apparatus 200 are designed to determine the shear strength for the W/A ratio range of 0.17 to 13.3. Hence the plurality of graph lines is defined for the W/A ratio range of 0.17 to 13.3. In an example, the data corresponding to the W/A ratio obtained from the fall cone apparatus 200 may be plotted on the second double logarithmic paper with the horizontal axis representing the W/A ratio values in g/degree and the vertical axis representing the first set of shear strength values in t/m² with all the graph lines parallel to each other. The tabulated empirical data were provided by SGI publication No. 14 by GEONOR [O'kelly, B.; Vardanega, P.; Haigh, S. Use of fall cones to determine Atterberg limits: a review. Géotechnique 2018, 68, 843-856, doi:10.1680/jgeot.17.R.0391].

At step 110 and the Stage-2 procedure, method 100 includes deducing a second mathematical model based on data obtained from the third plot 600. The second mathematical model is deduced and used to measure the shear strength of the soil. Particularly, the second mathematical model, or a mathematical expression, for a relationship between the shear strength and the W/A ratio is deduced using MS Excel 2016 (Microsoft, Redmond, WA, USA). Method 100 further includes deducing the second mathematical model based on a power function corresponding to a formula, $f(x)=\alpha x^p$. For each cone 206, with a coefficient of determination $(R^2)>0.99$, the power function is inferred as the best mathematical model of shear strength vs. W/A ratio. In other words, method 100 includes deducing the second mathematical model based on the coefficient of determination $(R^2)$ greater than 0.99. To verify the performance of the second mathematical model, Table 1 is developed. Table 1 shows equations, or the second mathematical models, corresponding to various penetration depth values. Each model has an $R^2$ almost equal to 1 for undrained shear strength at different penetration depth values.

TABLE 1

A set of second mathematical models shows the functions in FIG. 6

| Penetration | Mathematical Model |
|---|---|
| 1 | y = 19.271x$^{1.1934}$ |
| 2 | y = 4.8285x$^{1.1924}$ |
| 3 | y = 2.1488x$^{1.1919}$ |
| 4 | y = 1.2098x$^{1.1915}$ |
| 5 | y = 0.7748x$^{1.1911}$ |
| 6 | y = 0.5384x$^{1.1909}$ |
| 7 | y = 0.3957x$^{1.1907}$ |
| 8 | y = 0.3031x$^{1.1905}$ |
| 9 | y = 0.2396x$^{1.1903}$ |
| 10 | y = 0.1941x$^{1.1902}$ |
| 20 | y = 0.0486x$^{1.1892}$ |
| 30 | y = 0.0216x$^{1.1886}$ |
| 40 | y = 0.0122x$^{1.1882}$ |
| 50 | y = 0.0078x$^{1.1879}$ |
| 60 | y = 0.0054x$^{1.1877}$ |

TABLE 1-continued

A set of second mathematical models shows the functions in FIG. 6

| Penetration | Mathematical Model |
|---|---|
| 70 | y = 0.004x$^{1.1874}$ |
| 80 | y = 0.0031x$^{1.1873}$ |
| 90 | y = 0.0024x$^{1.1871}$ |
| 100 | y = 0.002x$^{1.1869}$ |

Figure 7:
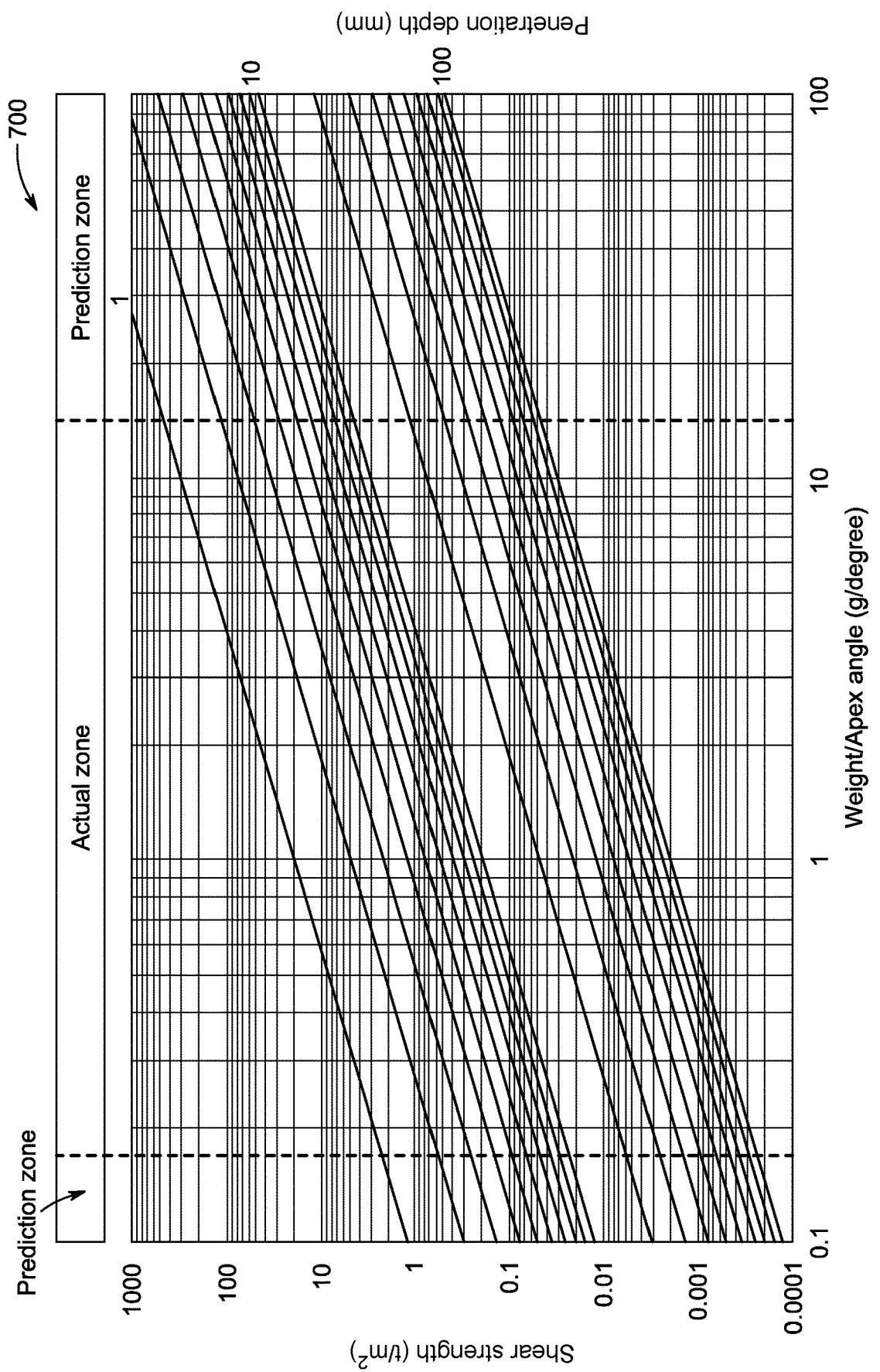
FIG. 7 is a graphical representation of a fourth plot on the second double logarithmic paper, according to an embodiment of the present disclosure.

At step 112 and the Stage-2 procedure, method 100 includes generating a fourth plot 700 on the second double logarithmic paper, as shown in FIG. 7, based on the second mathematical model. Each graph line is extended beyond the W/A range of 0.17 to 13.3 for a corresponding predefined W/A ratio range. Particularly, based on the prediction procedure, each graph line is extended until the end of the third plot 600 as best fit representative lines with W/A ratio values ranging from 0.1 to 100. As such, the predefined W/A ratio range for which the shear strength determined, according to the present disclosure, is 0.1 to 100. In other words, the W/A ratio range refers to the W/A ratio scale of 0.1 to 100 of the fourth plot 700. In some embodiments, the predefined W/A ratio range may be further extended beyond the range of 0.1 to 100 as desired. In such a case, the scale of the W/A ratio may be extended beyond the range of 0.1 to 100 in the fourth plot 700.

As shown in FIG. 7, the fourth plot 700 is separated by a prediction zone and an actual zone, and the graph lines are extended across the prediction zone and the actual zone. The actual zone of the fourth plot 700 is defined for the W/A ratio values ranging from 0.17 to 13.3, whereas the prediction zone of the fourth plot 700 is defined for the W/A ratio values ranging from 0.1 to 0.17 and 13.3 to 100. In some embodiments, the predefined W/A ratio range is 0.1 to 0.17. In some embodiments, the W/A ratio range is 13.3 to 100. The extended graph lines falling under the actual zone are defined based on the original data. The graph lines falling under the prediction zone are defined based on the prediction inferred from the second mathematical model.

At step 114 and the Stage-2 procedure, method 100 includes determining a second set of shear strength values based on the fourth plot 700. Particularly, method 100 includes determining the second set of shear strength values in a range of 0.0001-1000 t/m² based on the predefined penetration depth range and the predefined W/A ratio range. In other words, the second set of shear strength values correspond to a scale of shear strength ranging from 0.0001 to 1000 t/m² labeled in the vertical axis of the fourth plot 700.

In some embodiments, method 100 includes generating the first plot 400 on the first double logarithmic paper. The horizontal axis represents penetration depth values and the vertical axis represents the first set of shear strength values. The first plot 400 includes the plurality of graph lines defined for penetration depth values ranging from 4 to 20 mm Method 100 further includes deducing the first mathematical model based on the data obtained from the first plot 400. Method 100 further includes generating the second plot 500 on the first double logarithmic paper based on the first mathematical model. Each graph line is extended for the penetration depth values ranging from 1 to 100 mm Method 100 further includes generating the third plot 600 on the second double logarithmic paper. The horizontal axis represents the W/A ratio values, and the vertical axis represents the first set of shear strength values based on the data obtained from the plurality of cones 204. The third plot 600 includes the plurality of graph lines corresponding to the extended penetration depth values defined for the W/A ratio values ranging from 0.17 to 13.3. Method 100 further includes deducing the second mathematical model based on the data obtained from the third plot 600. Method 100 further includes generating the fourth plot 700 on the second double logarithmic paper based on the second mathematical model. Each graph line is extended for the W/A ratio values ranging from 0.1 to 100. Method 100 further includes determining the second set of shear strength values in the range of 0.0001-1000 t/m² based on the fourth plot 700 having the extended penetration depth range of 1 to 100 mm and the extended W/A ratio range 0.1 to 100. Each of the first mathematical model and the second mathematical model is deduced based on the power function corresponding to the formula, $f(x)=\alpha x^p$, wherein x is an independent variable, $\alpha \neq 0$ is a constant, and p is a real number.

Industrial Applicability

The present disclosure relates to method 100 of determining the shear strength of soil based on the fourth plot 700 developed using the fall cone apparatus 200, the first mathematical model, and the second mathematical model. The first plot 400 and the third plot 600 are generated using the data obtained from the fall cone apparatus 200, particularly, based on the available penetration depth values and the W/A ratio values. In contrast, the second plot 500 and the fourth plot 700 are generated based on the first and second mathematical models. With more than 99% of the coefficient of determination, the first and second mathematical models in the power function (fractal geometry) are highly accurate. The power equation represents the best behavior of cone 204 to measure the shear strength of the soil. With the fourth plot 700, many cones with more ranges of W/A ratios can be developed to increase the range of measurements of the undrained shear strength of cohesive soil. The range of W/A ratio extends from 0.1 to 100, while the penetration depth range extends from 1 to 100 mm Further, the measurements can be extended according to the inventive concept used in the present disclosure. Moreover, with the inventive concept of the present disclosure, any cone with any apex angle can be produced to measure the shear strength of the cohesive soil at any soil sample penetration depth.

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof.

ACKNOWLEDGMENT

The authors extend their appreciation to the Deputyship for Research & Innovation, Ministry of Education in Saudi Arabia for funding this research work through the project number "2021-086 "and King Abdulaziz University, DSR, Jeddah, Saudi Arabia.

What is claimed is:
1. A computer-based method of determining shear strength of soil using a fall cone apparatus, the method comprising:
performing fall cone measurements on a first set of soil of samples, using the fall cone apparatus and a plurality of cones, the first set of soil samples being soil samples with corresponding, mutually different shear strength values, and the cones in the plurality of cones having respective, mutually different weight per apex angle (W/A) ratio values, the W/A ratio values configured to provide a distribution of the penetration depth values over a range that extends from 4 millimeters (mm) to 20 mm, and recording the fall cone measurements as fall cone measurement data, each fall code measurement data associated with a corresponding fall cone measurement among the fall cone measurements, using a cone among the plurality of cones and a soil sample among the first set of soil samples, and indicating, for the fall cone measurement, the W/A ratio value of the cone, the penetration depth value, and the shear strength value of the soil sample:,
communicating the fall cone measurement data to a computer;
computer based generating, by the computer, a double logarithmic plot of the fall cone measurement data, the double logarithmic plot having first double logarithmic axes that includes a logarithmic first horizontal axis representing the penetration depth values and a logarithmic first vertical axis representing the first set of shear strength values and a plurality of plot marks, each of the plot marks corresponding to a fall cone measurement data and defined, relative to the logarithmic first horizontal axis, according to the logarithm of said fall cone measurement data's indicated penetration depth value and, relative to the logarithmic first vertical axis, according to the logarithm of said fall cone measurement data's indicated soil sample shear strength value;
computer based generating by the computer, a plurality of first plot lines for the double logarithmic plot of the fall cone measurement data, each of the first plot lines being a best fit line for a different set of plot marks among the plot marks, each different set of plot marks being associated with the W/A ratio of a different cone among the plurality of cones;
computer based deducing, by the computer, using a computer based data analysis process, a first mathematical model based on the first plot lines;
generating by the computer a second plot relative to the first double logarithmic axes, based on the first mathematical model and including a plurality of second plot graph lines, the generating the second plot being configured to generate each of the second plot graph lines as an extension of a corresponding first plot graph line, the extension being beyond the penetration depth range and for a corresponding predefined penetration depth range;
generating by the computer a third plot relative to second double logarithmic axes that include a second logarithmic horizontal axis representing W/A ratio values and a second logarithmic vertical axis representing the first set of shear strength values, wherein generating the third plot is based on data from the respective W/A ratio values for the plurality of cones and the third plot includes a plurality of third plot graph lines corresponding to the extended penetration depth values defined for the W/A ratio values ranging from 0.17 to 13.3;
computer based deducing, by the computer, using the computer based data analysis process, a second mathematical model based on data from the third plot graph lines;

generating, by the computer, a fourth plot relative to the second double logarithmic axes based on the second mathematical model, wherein each graph line is extended beyond the W/A ratio range for a corresponding predefined W/A ratio range; and generating, by the computer, a fourth plot relative to the second double logarithmic axes, based on the second mathematical model, wherein the fourth plot includes a plurality of fourth plot graph lines and each of the fourth plot graph lines is an extension of a corresponding third plot graph line and extends beyond the W/A ratio range for a corresponding predefined W/A ratio range;

measuring another fall cone penetration depth, for a test soil, using the fall cone apparatus or another fall cone apparatus, and using a cone having a cone W/A ratio value comparable to one of the W/A ratio values ranging from 0.17 to 13.3; and determining by the computer a of shear strength value for the test soil based on the another fall cone penetration depth, the cone W/A ratio value, and the fourth plot.

2. The method of claim 1, wherein deducing by the computer each of the first mathematical model and the second mathematical model is based on a power function corresponding to a formula, $f(x)=\alpha x^p$, wherein x is an independent variable, $\alpha \neq$ is a constant, and p is a real number.

3. The method of claim 1, wherein deducing by the computer the first mathematical model is based on coefficient of determination ($R^2$) for the fall cone measurement data greater than 0.99 and deducing the second mathematical model is based on coefficient of determination ($R^2$) for data from the third plot graph lines greater than 0.99.

4. The method of claim 1, further comprising determining the second set of shear strength values in a range of 0.0001-1000 t/m$^2$ based on the predefined penetration depth range and the predefined W/A ratio range.

5. The method of claim 1, wherein the predefined penetration depth range is 1 to 100 mm.

6. The method of claim 1, wherein the predefined penetration depth range is 1 to 4 mm.

7. The method of claim 1, wherein the predefined penetration depth range is 20 to 100 mm.

8. The method of claim 1, wherein the predefined W/A ratio range is 0.1 to 100.

9. The method of claim 1, wherein the predefined W/A ratio range is 0.1 to 0.17.

10. The method of claim 1, wherein the predefined W/A ratio range is 13.3 to 100.

11. The method of claim 1, wherein:
the plurality of cones of the fall cone apparatus comprises a first cone having a W/A ratio 13.3, a second cone having a W/A ratio 3.3, a third cone having a W/A ratio 1.00, and a fourth cone having a W/A ratio 0.17; and
the plurality of first plot lines for the double logarithmic plot of the fall cone measurement data includes a first plot first line that corresponds to the W/A ratio of 13.3, a first plot second line that corresponds to the W/A ratio of 3.3, a first plot third line that corresponds to the W/A ratio of 1.00, and a first plot fourth line that corresponds to the W/A ratio of 0.17.

12. A method of determining shear strength of soil using a fall cone apparatus, the method comprising:
performing fall cone measurements on a first set of soil of samples, using the fall cone apparatus and a plurality of cones, the first set of soil samples being soil samples with corresponding, mutually different shear strength values, and the cones in the plurality of cones having respective, mutually different weight per apex angle (W/A) ratio values, the W/A ratio values configured to provide a distribution of the penetration depth values over a range that extends from 4 millimeters (mm) to 20 mm, and recording the fall cone measurements as fall cone measurement data, each fall code measurement data associated with a corresponding fall cone measurement among the fall cone measurements, using a cone among the plurality of cones and a soil sample among the first set of soil samples, and indicating, for the fall cone measurement, the W/A ratio value of the cone, the penetration depth value, and the shear strength value of the soil sample;

communicating the fall cone measurement data to a computer;

computer based generating, by the computer, a double logarithmic plot of the fall cone measurement data, the double logarithmic plot having first double logarithmic axes that includes a logarithmic first horizontal axis representing the penetration depth values and a logarithmic first vertical axis representing the first set of shear strength values and a plurality of plot marks, each of the plot marks corresponding to a fall cone measurement data and defined, relative to the logarithmic first horizontal axis, according to the logarithm of said fall cone measurement data's indicated penetration depth value and, relative to the logarithmic first vertical axis, according to the logarithm of said fall cone measurement data's indicated soil sample shear strength value;

computer based generating by the computer, a plurality of first plot lines for the double logarithmic plot of the fall cone measurement data, each of the first plot lines being a best fit line for a different set of plot marks among the plot marks, each different set of plot marks being associated with the W/A ratio of a different cone among the plurality of cones;

computer based deducing, by the computer, using a computer based data analysis process, a first mathematical model based on the first plot lines;

computer based deducing, by the computer, using a computer based data analysis process, a first mathematical model based on data from the first plot;

computer generating, by the computer, a second plot relative to the first double logarithmic axes, based on the first mathematical model and including a plurality of second plot graph lines, each of the second plot graph lines extending is for penetration depth values ranging from 1 mm to 100 mm;

computer generating, by the computer, a third plot relative to second double logarithmic axes that include a second logarithmic horizontal axis representing (W/A ratio values and a second logarithmic vertical axis representing the first set of shear strength values, wherein generating the third plot is based on data from the respective W/A ratio values for the plurality of cones and, the third plot includes a plurality of third plot graph lines corresponding to the extended penetration depth values defined for the W/A ratio values ranging from 0.17 to 13.3;

computer based deducing, by the computer using the computer based data analysis process, a second mathematical model based on data from the third plot graph lines;

computer generating, by the computer, a fourth plot relative to the second double logarithmic axes based on the second mathematical model, wherein each graph line of the fourth plot is extended for W/A ratio values ranging from 0.1 to 100;

obtaining a plurality of second fall cone measurement data for a set of test soils, the second fall cone measurement data indicating different test soils among a set of test soils, indicating test penetration depths and indicating, for each test penetration depth, a W/A ratio of a test cone among a plurality of different test cones, the test soils having respective test soil shear strength values from among a second set of shear strength values, the a second set of shear strength values being in a range of 0.0001-1000 t/m$^2$, and the W/A ratios of the test cones being within the extended W/A ratio range of 0.1 to 100; and determining the second set of shear strength values based on the second fall cone measurement data, including the test penetration depths, the W/A rations of the test cones, and the fourth plot, including the second double logarithmic axes, wherein the computer based deducing of the first mathematical model and the computer based deducing of the second mathematical model are each based on a respective power function, each respective power function corresponding to a formula, $f(x)=\alpha x^p$, wherein x is an independent variable, $\alpha \neq 0$ is a constant, and p is a real number.

* * * * *